United States Patent
Choi et al.

(10) Patent No.: US 9,113,235 B2
(45) Date of Patent: Aug. 18, 2015

(54) DEVICE AND METHOD FOR FUNCTIONALITY SEQUENCING

(71) Applicant: Symbol Technologies, Inc., Schaumburg, IL (US)

(72) Inventors: Jaeho Choi, Whitestone, NY (US); Ian R. Jenkins, Stony Brook, NY (US); Richard M. Martin, New Hyde Park, NY (US); Chandra M. Nair, Mount Sinai, NY (US); Konstantinos D. Tslopanos, Selden, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 353 days.

(21) Appl. No.: 13/676,846

(22) Filed: Nov. 14, 2012

(65) Prior Publication Data

US 2014/0132389 A1       May 15, 2014

(51) Int. Cl.
   *H04Q 1/00*       (2006.01)
   *G06K 7/10*       (2006.01)
   *G06K 7/14*       (2006.01)

(52) U.S. Cl.
   CPC .............. *H04Q 1/00* (2013.01); *G06K 7/10118* (2013.01); *G06K 7/146* (2013.01); *G06K 7/1443* (2013.01)

(58) Field of Classification Search
   CPC ............. G06K 7/01; G06K 7/10; G06K 9/00; G06F 17/00
   USPC ................. 235/470, 385, 375, 462.08, 462.2; 715/863; 396/297; 340/572.1; 382/104
   See application file for complete search history.

(56) References Cited

U.S. PATENT DOCUMENTS

| | | | |
|---|---|---|---|
| 4,411,016 | A | 10/1983 | Wakeland |
| 4,538,072 | A | 8/1985 | Immier et al. |
| 5,408,535 | A | 4/1995 | Howard, III et al. |
| 5,880,451 | A | 3/1999 | Smith et al. |
| 7,325,737 | B2 | 2/2008 | Epshteyn et al. |
| 7,726,575 | B2 | 6/2010 | Wang et al. |
| 8,028,920 | B2 | 10/2011 | Barkan |
| 8,056,808 | B2 | 11/2011 | Epshteyn |
| 8,096,475 | B2 | 1/2012 | Perera et al. |
| 8,113,432 | B2 | 2/2012 | Kimura et al. |
| 8,120,696 | B2 | 2/2012 | Jerdev |
| 8,179,563 | B2 | 5/2012 | King et al. |
| 8,469,275 | B2 | 6/2013 | Dahari |
| 8,532,346 | B2 | 9/2013 | Thorn |

(Continued)

OTHER PUBLICATIONS

International Search Report and Written Opinion in counterpart application PCT/US2013/068682 dated Jul. 4, 2014.

*Primary Examiner* — Steven Lim
*Assistant Examiner* — Kaleria Knox

(57) ABSTRACT

A device and method automatically executes a predetermined procedure. The method includes receiving input data by a mobile unit (MU), the input data including a request for output data, the MU including a data capture module. The method includes obtaining external data using the data capture module, the external data being indicative of at least one external condition related to the MU. The method includes selecting one of at least one capture engine of the data capturing module as a function of the external data and the input data, the selected capture engine configured to obtain the output data. The method includes automatically executing a predetermined procedure using the MU as a function of the selected capture engine and the external data, the predetermined procedure including a plurality of steps, one of the steps being obtaining the output data.

18 Claims, 2 Drawing Sheets

(56) References Cited

U.S. PATENT DOCUMENTS

| | | |
|---|---|---|
| 8,596,541 B2 | 12/2013 | Chiu et al. |
| 2002/0030094 A1* | 3/2002 | Curry et al. .................. 235/375 |
| 2004/0195320 A1* | 10/2004 | Ramsager ..................... 235/385 |
| 2005/0203846 A1 | 9/2005 | Noguchi |
| 2006/0098245 A1 | 5/2006 | Park |
| 2008/0128499 A1 | 6/2008 | Chen et al. |
| 2009/0001173 A1 | 1/2009 | Sevier et al. |
| 2009/0078774 A1 | 3/2009 | He |
| 2009/0152358 A1* | 6/2009 | Epshteyn et al. ........... 235/462.2 |
| 2010/0037184 A1* | 2/2010 | Sie ................................ 715/863 |
| 2010/0157280 A1 | 6/2010 | Kusevic et al. |
| 2011/0068172 A1 | 3/2011 | Liu |
| 2011/0169917 A1 | 7/2011 | Stephen et al. |
| 2011/0290889 A1* | 12/2011 | Tamburrini et al. ........... 235/470 |
| 2013/0063620 A1 | 3/2013 | Kim et al. |
| 2013/0121546 A1 | 5/2013 | Guissin |
| 2013/0201392 A1 | 8/2013 | Gutierrez |
| 2013/0341401 A1* | 12/2013 | Kannan et al. ........... 235/462.08 |
| 2014/0138441 A1 | 5/2014 | Devalos et al. |

\* cited by examiner

DEVICE AND METHOD FOR FUNCTIONALITY SEQUENCING

FIELD OF THE DISCLOSURE

The invention relates to a mobile unit performing a data capture functionality and automatically performing at least one predetermined further functionality.

BACKGROUND

A conventional mobile unit (MU) may be configured with a data capture functionality. For example, the data capture functionality may be a barcode scan. The user is required to position a scanning engine of the barcode scanner within a range of view so that the scanning engine is triggered for the barcode to be scanned, captured, and subsequently decoded. In another example, the data capture functionality may be a radio frequency identification (RFID) component configured to receive a RFID signal from a RFID tag. The user is required to be within a transmission range of the RFID tag and trigger the capture of the data encoded within the tag. The data received from the data capture functionality may also be used for further reasons.

Thus, the MU may further be configured to perform other functionalities. The data capture functionality may be an image capture of an area including a barcode. Accordingly, the MU may be configured with an additional functionality in which the image captured by the data capture functionality is processed. For example, a location of the barcode within the image may be determined for the subsequent decoding. However, the user is required to activate an application that provides this functionality. The user may also be required to manipulate the captured image given features of the application for the location to be determined by the application. In addition, further aspects of the application may require other user interactions. In a similar manner, if other functionalities are to be performed beyond the data capture functionality, the user is required to first activate a respective application that performs the other functionalities as well as provide additional user interactions for each application that is launched to perform the other functionalities. Those skilled in the art will also understand that when multiple applications are used for each functionalitiy to be performed, the user is required to navigate through the applications (e.g., opening and closing each application) which may be cumbersome, inefficient, etc., particularly when using a portable electronic device.

Accordingly, there is a need for automatically determining further functionalities on a MU so that the further functionalities may be performed without user intervention after performing a data capture funtionality.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
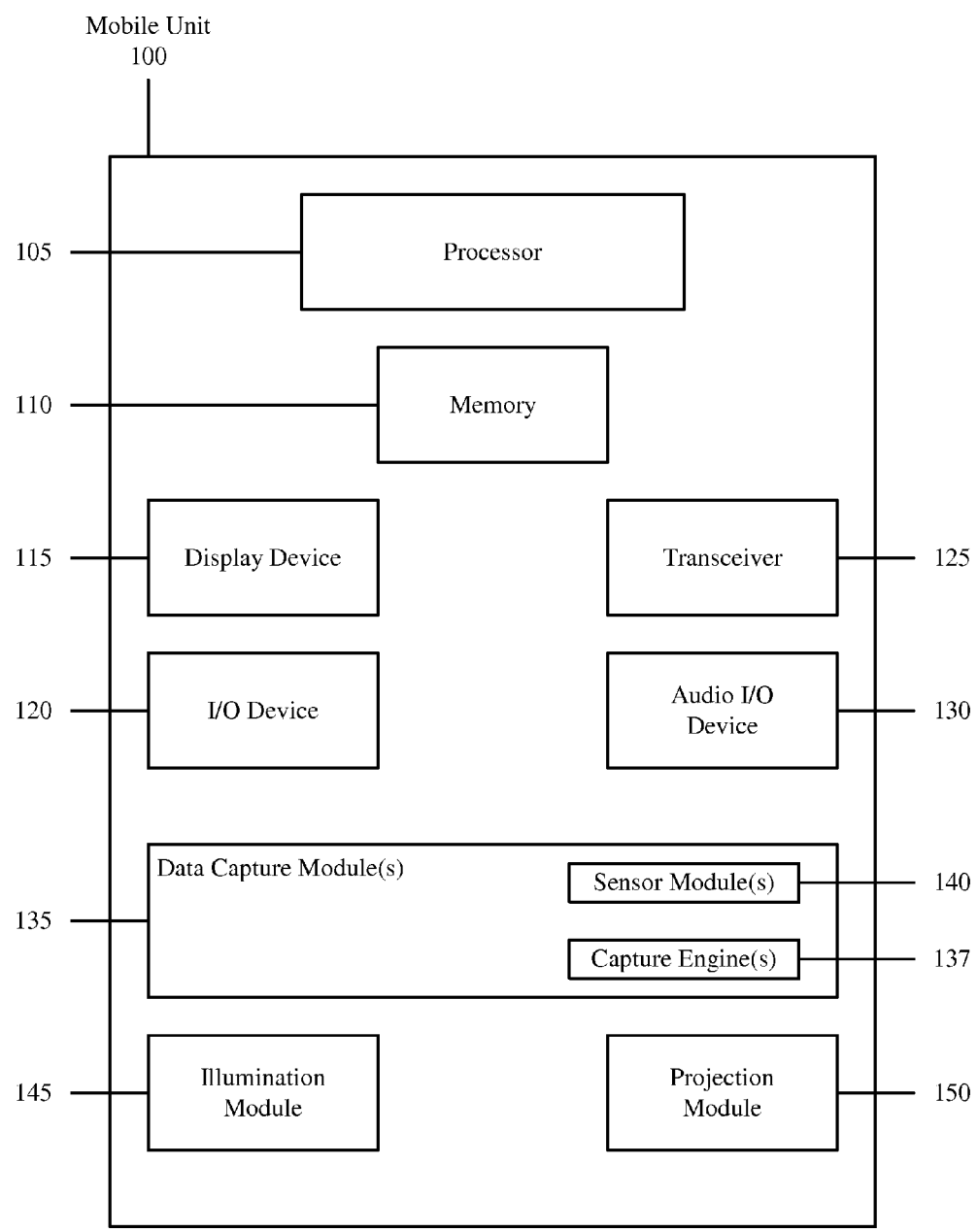
FIG. 1 illustrates components of a mobile unit for performing a predetermined functionality in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a device and method for functionality sequencing. The method comprises receiving input data by a mobile unit (MU), the input data including a request for output data, the MU including a data capture module; obtaining external data using the data capture module, the external data being indicative of at least one external condition related to the MU; selecting one of at least one capture engine of the data capturing module as a function of the external data and the input data, the selected capture engine configured to obtain the output data; and automatically executing a predetermined procedure using the MU as a function of the selected capture engine and the external data, the predetermined procedure including a plurality of steps, one of the steps being obtaining the output data.

The exemplary embodiments may be further understood with reference to the following description and the appended drawings, wherein like elements are referred to with the same reference numerals. The exemplary embodiments describe a device and method for performing a data capture functionality and automatically performing at least one predetermined further functionality. Specifically, a user of a MU is required to only trigger the data capture functionality which further activates at least one predetermined further functionality. The data capture functionality, the further functionalities, and a related method will be discussed in further detail below.

FIG. 1 illustrates components of the MU 100 for performing a predetermined functionality in accordance with an exemplary embodiment of the present invention. The MU 100 may be any portable device such as a mobile phone, a personal digital assistant, a smartphone, a tablet, a laptop, a barcode reader, etc. However, it should be noted that the MU 100 may represent any type of device that is capable of performing a data capture functionality. Accordingly, the MU 100 may also represent a non-portable device. As illustrated in FIG. 1, the MU 100 may include a processor 105, a memory arrangement 110, a display device 115, an input/output (I/O) device 120, a transceiver 125, an audio I/O device 130, at least one data capture module 135 including at least one capture engine 137 and at least one sensor module 140, an illumination module 145, and a projection module 150. However, it should be that the MU 100 may include other components such as a portable power supply (e.g., a battery).

The MU 100 may be designed with differentiated ergonomic features. As illustrated in FIG. 1, the MU 100 may include a housing in which a handle extends for the user to grip the MU 100. The display device 115 may be at least partially disposed on the housing to face the user. On an opposing side, the MU 100 may include a trigger disposed on the handle for the user to activate the data capture functionality. On the same side, the MU 100 may further include components facing away from the user that are related to the data capture module 135, the illumination module 145, and the projection module 150.

The processor 105 may provide conventional functionalities for the MU 100. For example, the MU 100 may include a plurality of applications that are executed on the processor 105 such as an application including a web browser when connected to a communication network via the transceiver 125. As will be discussed in further detail below, the processor 105 may also be configured to execute a predetermined procedure that may include at least one functionality after a data capture functionality utilizing the capture engine 137 is executed. The memory 110 may also provide conventional functionalities for the MU 100. For example, the memory 110 may store data related to operations performed by the processor 105. As will be described in further detail below, the memory 110 may also store data related to the predetermined procedure to be performed after the data capture functionality. The transceiver 125 may be any conventional component configured to transmit and/or receive data. The transceiver 125 may therefore enable communication with other electronic devices directly or indirectly through a network.

The display device 115 may be any component configured to show data to a user. The display device 115 may be, for example, a liquid crystal display (LCD) to conform to the size of the electronic device 100. The I/O device 120 may be any component configured to receive an input from the user. For example, the I/O device 120 may be a keypad (e.g., alphanumeric keypad, numeric keypad, etc.). The I/O device 120 may also be a touch sensing pad for a user to enter inputs manually with a finger(s) or a stylus. It should be noted that the display device 115 may also incorporate the I/O device 120, particularly when the I/O device 120 is a touch sensing pad including an area in which the user may enter inputs. In another example, the I/O device 120 may be a transparent touch sensor placed on top of the display 115 that enables a user to enter inputs.

The audio I/O device 130 may be any conventional audio receiver and/or audio player. Accordingly, the audio I/O device 130 may include, for example, a microphone to receive audio data and a speaker to play audio data. The illumination module 145 may be any conventional device configured to provide a lighting feature to an area external to the MU 100. Accordingly, the illumination module 145 may be, for example, a light bulb, a light emitting diode, a laser pointer, etc. configured to provide illumination to a target area. The projection module 150 may be any conventional device configured to provide a visual display to an area external to the MU 100. Accordingly, the projection module 150 may be, for example, a projector configured to show predetermined projection data on a surface.

The data capture modules 135 may be any device configured to obtain data such as from a target device or area or from the environment in which the MU is disposed. The data capture module 135 may also be configured in a modular fashion. Accordingly, the MU 100 may be designed to incorporate a plurality of data capture modules 135. Depending on the manner in which the data capture module 135 operates, the MU 100 may include the data capture module 135 in a respective manner for the functionality thereof to be performed. As will be described in further detail below, the data from the data capture module 135 may include capture engines 137 and sensor modules 140 that are used to determine the predetermined further functionalities to be performed.

The MU 100 may include at least capture engine 137. A first capture engine 137 may be a barcode scanner. Accordingly, the capture engine 137 may include a scanning engine. The barcode scanner may be any conventional device configured with the scanning engine to capture data encoded in a 1-dimensional or 2-dimensional barcode. Accordingly, the barcode scanner may be disposed within the housing of the MU 100 with a field of view oriented toward the barcode. A second capture engine 137 may be an imager. The imager may be any conventional device configured with an imaging engine to capture an image of a target area. Accordingly, the imager may also be disposed within the housing of the MU 100 with a field of view oriented toward the target area. A third capture engine may be a camera. The camera may be any camera module disposed within the housing of the MU 100 with a field of view toward the target area. A fourth capture engine 137 may be a RFID transceiver. The RFID transceiver may be any conventional device configured with a receiver to receive data endoded in a RFID tag. Accordingly, the RFID transceiver may be diposed within the housing of the MU 100 with an operating area so that when the RFID tag is within the operating area, the data encoded therein may be received.

The sensor module 140 may be any data capture device configured to receive data related to the MU 100. For example, the sensor module 140 may provide externally related data. Accordingly, one type of the data capture modules 135 may be the sensor modules 140 that also capture data, in particular, the externally related data. The externally related data may be location data, proximity data, motion data, orientation data, ambient light data, temperature data, dimension data, etc. That is, the externally related data may relate to an external condition of the MU 100. For example, the location data, the proximity data, the motion data, the orientation data, the ambient light data, and the temperature data, may relate to an external condition of the MU 100 relative to an environment in which it is disposed. The MU 100 may further utilize the externally related data to determine the predetermined procedure including further functionalities to be performed. The sensor module 140 may also be configured in a modular fashion. Accordingly, the MU 100 may be designed to incorporate a plurality of sensor modules 140. Depending on the manner in which the sensor module 140 operates, the MU 100 may include the sensor module 140 in a respective manner for the functionality thereof to be performed. The sensor module 140 may generate the externally related data in a variety of ways. In a first example, the sensor module 140 may continuously generate the externally related data (e.g., prior to, during, after, etc. the data capture functionality is activated). In a second example, the sensor module 140 may periodically generate the externally related data. In a third example, the sensor module 140 may dynamically generate the externally related data such as generating the data upon activating the data capture functionality.

The MU 100 may include at least one sensor module 140. A first sensor module 140 may be a proximity sensor. The proximity sensor may be configured to determine a distance to a target location. For example, the proximity sensor may be a laser pointer that transmits a laser to the target location and a return signal (e.g., reflection) may be used to gauge the distance. In another example, the proximity sensor may transmit a radial signal in which a reflection is used to gauge the distance. The target location may be, for example, an area in which the capture engine 137 is to scan a barcode, capture an image. The distance may also generally represent a measurement between the MU 100 and the target location. A second sensor module 140 may be a motion sensor. The motion sensor may be configured to determine a relative movement of the MU 100. For example, the motion sensor may be an accelerometer that detects whether the MU 100 is stationary (e.g., user has stopped) or moving (e.g., user is moving, in a vehicle, etc.). A third sensor module 140 may be an ambient light sensor. The ambient light sensor may be configured to determine an amount of illumination in a location that the MU 100 is disposed. For example, in an unlit warehouse environment, the ambient lighting may be dim that would prevent a proper data capture to be performed. A fourth sensor module 140 may be a position sensor. For the example, the position sensor may be a global positioning system (GPS). The GPS may transmit data to a network that determines the location of the MU 100. The position sensor may also be a local positioning system (LPS). The LPS may transmit data to a local network that determines the location of the MU 100 within a predetermined space (e.g., warehouse). In another example, the position sensor may be a compass. The compass may determine an orientation of the MU 100 such as a direction that the MU 100 is facing at a given time.

According to the exemplary embodiments, the MU 100 may be configured to activate the data capture functionality on the data capture module 135. Specifically, the user may provide input data that relates to a request for the capture engine 137 to be used to perform a data capture functionality. As discussed above, the MU 100 may be configured with the I/O device 120 to activate the data capture functionality (e.g., touching the display device 115, depressing the trigger on the housing, etc.). When the data capture functionality is activated, the processor 105 may perform further functionalities. The further functionalities to be performed may be determined by the processor 105 as a function of a variety of factors. For example, the type of data capture functionality may indicate the further functionalities. In another example, the data generated by the sensor module 140 may indicate the further functionalities. The further functionalities may be performed to enhance the data capture functionality, to provide further data with regard to the data capture functionality, to perform other functionalities that utilizes the data of the data capture functionality, etc.

In a first exemplary embodiment, the user may provide an input to perform a data capture functionality using the capture engine 137 in which the processor 105 determines that the capture engine 137 is a barcode scanner. Accordingly, a further functionality to be performed may be to activate the sensor module 140 which may be the proximity sensor. The proximity sensor may generate distance data between the MU 100 and the barcode to be scanned. The processor 105 may utilize the distance data to enhance the data capture functionality to better perform the barcode scan. In another example, if the capture engine 137 is a camera, the distance to the target may be determined from a further functionality being performed where a zoom feature is utilized. If the proximity sensor includes a laser pointer distance capture feature, the orientation and grid position of the object may also be determined using a further application. Accordingly, a X-Y-Z position of the object may be determined, a size of the object may be determined, etc. It should be noted that other capture engines 137 may also be utilized for the further functionalities that determine the above listed features. For example, if the capture engine 137 is a camera, utilizing a laser pointer and/or an accelerometer, the dimensions of an object may be determined. In this manner, the type of data capture functionality to be performed is indicative of the further functionality to be performed.

In a second exemplary embodiment, the user may provide an input to request that a data capture functionality be performed with the capture engine 137 in which the processor 105 determines that the capture engine 137 is an imager. The processor 105 may perform the data capture functionality so that the imager captures an image of a target area. The processor 105 may further determine whether further functionalities are to be performed, for example, as a function of the captured image. The captured image may include a barcode. The processor 105 may perform a further functionality that determines a location of the barcode within the captured image. In this scenario, the processor 105 may automatically execute an application that may manipulate the captured image to properly decode the barcode, particularly in the case of a 2-dimensional barcode. In this manner, the type of data capture functionality that is performed is indicative of the further functionality to be performed.

In a third exemplary embodiment, the user may provide an input to request that a data capture functionality be performed with the capture engine 137. The processor 105 may automatically perform predetermined further functionalities as a function of the data capture functionality being activated. In a first example, the processor 105 may capture an image of the object of the target area. If the data capture functionality is a decoding of a 1-dimensional barcode, conventional scanning engines simply receive the data encoded therein. However, the exemplary embodiments of the present invention may be configured so that an image is captured. Further functionalities may be performed in this respect. If the barcode scanner is incapable of decoding the data of the 1-dimensional barcode (e.g., barcode is damaged), the processor 105 may utilize the image captured of the barcode so that an application is automatically launched to decipher the 1-dimensional barcode for decoding. In this manner, multiple further functionalities may be performed such as in a sequence. In a second example, the activation of the data capture functionality may automatically launch an application that determines a location of the MU 100 such as with the position sensor of the sensor module 140. The location data generated by the position sensor may be used in a variety of manners. The location data may be associated with the data of the barcode so that when the item is searched, the location of the item may also be known. The location data may also be used with the projection module 150. The location data may be projected onto the item in which the barcode is disposed. In a specific exemplary embodiment, the location data may further pertain to an exact location within a warehouse environment. Thus, other location data such as an aisle number, a pallet number, a stop number, etc. may be projected onto the item. The location data may further be incorporated in a view of the display device 115 (as shown in FIG. 1). The location data may additionally be transmitted to a network location or referenced to stored data in the memory 110 that includes instructions or other related data pertaining to the item in which the barcode is disposed. The instructions or other related data may relate to a delivery of the item, a movement of the item, etc. This data may also be projected onto the item or shown on the display device 115. The location data may also be indicative of the type of data capture functionality to be used. If the MU 100 is disposed in a particular type of location, the processor 105 may determine that the most appropriate capture engine 137 is the imager. Thus, the location data may also be used in this respect. In this manner, the activation of the data capture functionality may entail further functionalities to be performed independently of the item and the type of data capture functionality.

In a fourth exemplary embodiment, the user may provide input to request that a data capture functionality be performed with the capture engine 137 in which multiple items are captured in an image. The processor 105 may determine that multiple items are disposed within the field of view of the imager that captured the image. The processor 105 may launch at least one application so that further analyses may be performed on the captured image. For example, the processor 105 may analyze a quantity of the multiple items. The processor 105 may determine a count of the number of items in the captured image. When a single type of item is stacked, the processor 105 may determine how many of the item is in the location. In another example, the processor 105 may determine if a barcode is disposed on each of the items in the captured image. Accordingly, each barcode may be decoded in this manner. In yet another example, the processor 105 may perform any of the aforementioned applications for each of the items in the captured image. Thus, multiple projections may be displayed on the image with each projection being disposed on the respective item, data may be updated on an image shown on the display device 115 relating to each item, etc.

In a fifth exemplary embodiment, the user may provide input to request that a data capture functionality be performed when the MU 100 includes a plurality of capture engines 137. The processor 105 may be configured to automatically determine a variety of manners to perform the data capture. The processor 105 may utilize externally related data generated by at least one of the sensor modules 140. For example, the ambient light sensor may indicate how much light is present in the environment that the MU 100 is disposed. If the processor 105 determines that not enough light is present, the processor 105 may activate the illumination module 145 to create additional light for the data capture functionality to be properly performed. In another example, if the ambient light sensor indicates a certain amount of light, this data may be used by the processor 105 to determine which of the capture engines 137 to utilize to capture the data. If sufficient light is present for a barcode to be decoded, the processor 105 may activate the barcode scanner to be used. If insufficient light is present, the processor 105 may activate the imager for an image to be captured of the barcode. Using the aforementioned application, the barcode may be deciphered within the image. Other sensor modules 140 may be used to determine the type of data capture module to be used. For example, the proximity sensor may indicate that the barcode is too far from the MU 100. Accordingly, a high-definition image may be captured of the image in which the image may be manipulated (e.g., zoom) and the location of the barcode may be determined for the data capture functionality to decode the data therein. An area scan using the imager may be performed to determine the type of data capture functionality to be used by capturing an initial image of the area. For example, if a number of barcodes are to be scanned is below a predetermined threshold, the processor 105 may determine that the barcode scanner may be used in succession to capture all the data. The processor 105 may also determine the locations in which the barcodes are disposed so that the scanning engine is properly oriented for each scan. In another example, if the number of barcodes to be scanned is above the predetermined threshold, the processor 105 may capture a further image (or utilize the initial image) so that each barcode is scanned.

In a sixth exemplary embodiment, the sensor modules 140 may include a rear facing camera and a front facing camera. The rear facing camera may be oriented to have a field of view facing a target area. The front facing camera may be oriented to have a field of view facing the user of the MU 100. When the capture engine 137 is activated, the rear facing camera may be oriented toward the target area that may include a barcode. The processor 105 may be configured to validate whether the target area is one selected by the user. For example, the front facing camera may capture an image of a facial expression of the user. Using known facial feature determination algorithms, the processor 105 may determine a target area being viewed by the user using data captured by the front facing camera and the rear facing camera. In this manner, the MU 100 may be configured to execute further functionalities that determine whether a barcode in the target area is one selected and desired to be captured by the capture engine 137 as a function of the user's facial expression captured by the front facing camera.

It should be noted that the above described examples are exemplary only. According to a preferred exemplary embodiment of the present invention, the processor 105 may be configured to perform any combination of the above described examples. Thus, the processor 105 may perform further functionalities prior to the data capture functionality (e.g., determining a location to determine the type of data capture functionality), may perform the further functionalities upon activation of the data capture functionality (e.g., determining an ambient light setting), may perform the further functionalities as a function of the type of data capture functionality (e.g., capturing an image), may perform the further functionalities which are predetermined as a function of the data generated by the data capture functionality, may perform the further functionalities as a sequence, etc.

Figure 2:
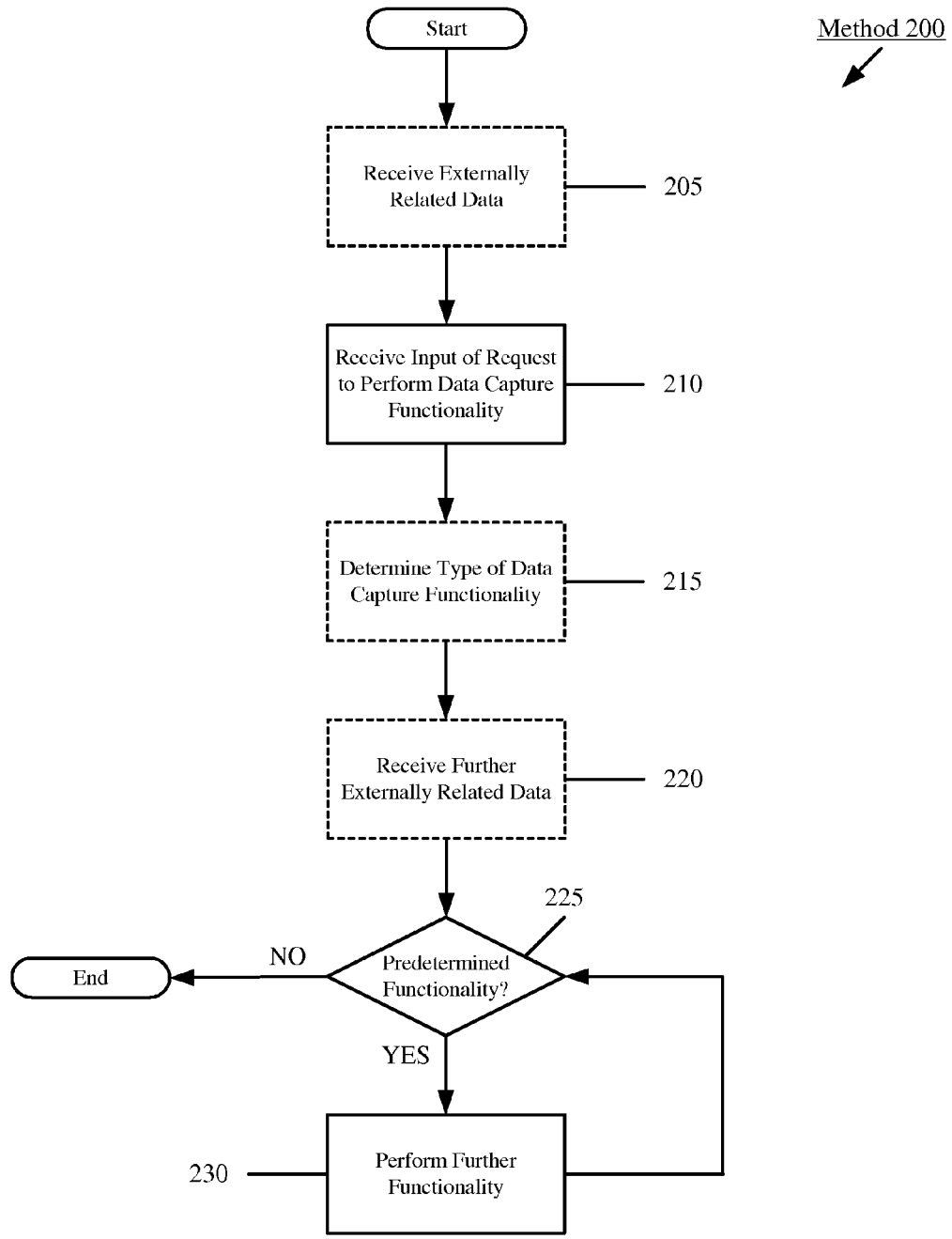
FIG. 2 illustrates a flowchart of a method for performing a predetermined functionality in accordance with some embodiments.

FIG. 2 is a flowchart of a method 200 for performing a predetermined functionality in accordance with some embodiments. Specifically, the MU 100 may be configured to perform a data capture functionality which activates a predetermined further functionality. The method 200 will be described with reference to the MU 100 of FIG. 1.

In optional step 205, the sensor modules 140 may generate externally related data. As discussed above, the sensor modules 140 may provide the processor 105 with externally related data that may be used to determine a variety of factors, particularly the type of capture engine 137 to be utilized for the data capture functionality. For example, the ambient light sensor may generate lighting data that the processor 105 uses to determine the type of capture engine 137 to be used. In another example, the location sensor may generate location data that the processor 105 also uses to determine the type of capture engine 137 to be used.

In step 210, the processor 105 receives an input from the user of a request to perform the data capture functionality using the capture engine 137. If the input is received, the user may manually select the type of capture engine 137 to be used. However, in optional step 215, the processor 105 may determine the type of capture engine 137 to be used. If the externally related data is received in step 205, the processor 105 may determine one of a plurality of capture engines 137 to be used. Accordingly, the user may simply trigger that the data capture functionality is to be used. The data capture functionality determined in step 215 may also be used for other purposes. As discussed above, the type of data capture functionality may be used to determine the further functionalities, as will be discussed in step 225.

In optional step 220, the sensor modules 140 may generate further externally related data. As discussed above, the processor 105 may be configured to activate the sensor modules 140 upon the activation of the data capture functionality. Accordingly, the method 200 may generate further externally related data. For example, upon the activation of the data capture functionality, the proximity sensor may be activated to generate distance data. In another example, the ambient light sensor may be activated to determine an amount of ambient lighting. In yet another example, an image of a target area may be captured for processing to determine the further functionalities.

In step 225, the processor 105 determines if predetermined further functionalities are to be performed. When a predetermined further functionality is to performed, the method 200 continues to step 230 where it is performed. As discussed above, the predetermined further functionalities may be performed as a function of the data capture functionality being activated, as a function of the externally related data generated in step 205, as a function of the type of data capture functionality determined in step 215, as a function of the further externally related data determined in step 220, etc. Using any combination or all of these factors, the processor 105 may perform a predetermined further functionality. Subsequently, the method 200 returns to step 225. The method 200 repeats until each predetermined further functionality has been performed, particularly when a sequence of predetermined further functionalities are to be performed.

It should be noted that the capture engine 137 may obtain encoded data from a source (e.g., barcode, RFID tag, etc.) at any time during the method 200. As discussed above, the data obtained from the capture engine 137 may also be utilized to determine whether predetermined further functionalities are to be performed. For example, an image captured by an imager for the data capture functionality may be used to determine whether predetermined further functionalities are to be performed in step 225. In another example, the data capture functionality may be performed so that a sequence of predetermined further functionalities may be performed such as determining instructions for the item, projecting data on the item, updating a view of the display device 115, etc.

The exemplary embodiments of the present invention provide a device and method for performing predetermined further functionalities after activating a data capture functionality. The user of the MU may activate the data capture functionality. The data capture functionality may be performed by at least one of a plurality of capture engines to obtain output data from a source such as a barcode or RFID tag. The MU may be configured to automatically perform at least one predetermined further functionality based upon a variety of factors. In a first example, the predetermined further functionalities may be independent such as when a sequence of functionalities are performed. In a second example, the predetermined further functionalities may be based upon the type of data capture functionality. In a third example, the predetermined further functionalities may be based upon externally related data generated by at least one of a plurality of sensor modules of the MU. In this manner, the user is required a single action for a plurality of functionalities to be performed in relation to a data capture functionality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. a method, comprising:
receiving input data from a user by a mobile unit (MU), the input data including a request for data capture functionality, the MU comprising at least one capture engine and at least one sensor module;
obtaining external data using the at least one sensor module data capture module, the external data being indicative of at least one external condition related to the MU;
selecting one of the at least one capture engine of the data capturing module as a function of the external data and the input data, the selected capture engine configured to obtain output data using the data capture functionality; and
automatically executing a predetermined procedure using the MU as a function of the selected capture engine and the external data, the predetermined procedure including a plurality of steps, one of the steps being obtaining the output data; and
the predetermined procedure is a sequence of a plurality of predetermined functionalities;
wherein the sequence includes at least one of capturing an image of a target area having at least one barcode disposed therein, determining whether encoded data of the barcode is capable of being decoded, determining a specific location within a warehouse, projecting the specific location onto the target area, projecting instructions related to an item onto the target area, updating a view on a display device of the MU with at least one of the specific location and the instructions, and determining the selected capture engine as a function a location of the MU.

2. The method of claim 1, wherein the selected capture engine is a barcode scanner and the at least one sensor module is a proximity sensor.

3. The method of claim 2, wherein the predetermined procedure is determining at least one of an orientation, a grid position, and a size of an object on which a barcode is disposed.

4. The method of claim 1, wherein the selected capture engine is an imager and the predetermined procedure includes locating a barcode within an image captured by the imager.

5. The method of claim 1, wherein the selected capture engine comprises a radio frequency identification (RFID) transceiver and the predetermined procedure comprises decoding the output data received from at least one RFID tag.

6. The method of claim 1, wherein the capture engine is an imager, and wherein the predetermined procedure includes a first functionality of determining a number of a plurality of items within a field of view of the capture engine.

7. The method of claim 6, wherein the predetermined procedure includes a second functionality of determining a location of a barcode disposed on each item and a third functionality of decoding encoded data for each barcode.

8. The method of claim 1, wherein the external condition includes at least one of location data of the MU, proximity data between the MU and a target area, and ambient lighting data for an environment in which the MU is disposed.

9. a mobile unit (MU), comprising:
a data capture module comprising at least one sensor module configured to obtain external data, the external data being indicative of at least one external condition related to the MU, the data capture module further comprising at least one capture engine configured to obtain output data;
a memory arrangement configured to store the external data; and
a processor configured to receive input data from a user including a request to perform data capture functionality for the output data, the processor configured to select one of the at least one capture engine as a function of the external data and the input data, the processor configured to automatically execute a predetermined procedure as a function of the selected capture engine and the external data, the predetermined procedure including a plurality of steps, one of the steps being obtaining the output data;
the predetermined procedure is a sequence of a plurality of predetermined functionalities;
the sequence includes at least one of capturing an image of a target area having at least one barcode disposed therein, determining whether encoded data of the barcode is capable of being decoded, determining a specific location within a warehouse, projecting the specific location onto the target area, projecting instructions related to an item onto the target area, updating a view on a display device of the MU with at least one of the specific location and the instructions, and determining the selected capture engine as a function a location of the MU.

10. The MU of claim 9, wherein the selected capture engine is a barcode scanner and the at least one sensor module comprises a proximity sensor.

11. The MU of claim 10, wherein the predetermined procedure comprises determining at least one of an orientation, a grid position, and a size of an object in which a barcode is disposed.

12. The MU of claim 9, wherein the selected capture engine is an imager and the predetermined procedure includes locating a barcode within an image captured by the imager.

13. The MU of claim 9, wherein the selected capture engine is a radio frequency identification (RFID) transceiver and the predetermined procedure comprises decoding the output data received from at least one RFID tag.

14. The MU of claim 9, wherein the predetermined procedure is a sequence of a plurality of predetermined functionalities.

15. The MU of claim 14, wherein the sequence includes at least one of capturing an image of a target area having at least one barcode disposed therein, determining whether encoded data of the barcode is capable of being decoded, determining a specific location within a warehouse, projecting the specific location onto the target area, projecting instructions related to an item onto the target area, updating a view on a display device of the MU with at least one of the specific location and the instructions, and determining the selected capture engine as a function of the specific location.

16. The MU of claim 9, wherein the capture engine is an imager, and wherein the predetermined procedure includes a first functionality of determining a number of a plurality of items within a field of view of the capture engine.

17. The MU of claim 16, wherein the predetermined procedure includes a second functionality of determining a location of a barcode disposed on each item and a third functionality of decoding encoded data for each barcode.

18. A non-transitory computer readable storage medium including a set of instructions executable by a processor, the set of instructions operable to:

receive input data from a user by a mobile unit (MU), the input data including a request for data capture functionality, the MU including a data capture module comprising at least one capture engine and at least one sensor module;

obtain external data using the at least one sensor module, the external data being indicative of at least one external condition related to the MU;

select one of the at least one capture engine of the data capturing module as a function of the external data and the input data, the selected capture engine configured to obtain the output data via the data capture functionality;

automatically execute a predetermined procedure using the MU as a function of the selected capture engine and the external data, the predetermined procedure including a plurality of steps, one of the steps being obtaining the output data;

the predetermined procedure is a sequence of a plurality of predetermined functionalities;

the sequence includes at least one of capturing an image of a target area having at least one barcode disposed therein, determining whether encoded data of the barcode is capable of being decoded, determining a specific location within a warehouse, projecting the specific location onto the target area, projecting instructions related to an item onto the target area, updating a view on a display device of the MU with at least one of the specific location and the instructions, and determining the selected capture engine as a function a location of the MU.

* * * * *